United States Patent [19]

Yamamoto

[11] Patent Number: 4,511,664

[45] Date of Patent: Apr. 16, 1985

[54] PROCESS FOR MANUFACTURING CERAMIC FIBERS CONSISTING MAINLY OF ALUMINA AND SILICA

[75] Inventor: Masafumi Yamamoto, Toyokawa, Japan

[73] Assignee: Isolite Babcock Refractories Co., Ltd., Aichi, Japan

[21] Appl. No.: 617,192

[22] Filed: Jun. 4, 1984

[30] Foreign Application Priority Data

Oct. 4, 1983 [JP] Japan ............................... 58-186578

[51] Int. Cl.$^3$ ............................................ C03C 13/00
[52] U.S. Cl. ........................................ 501/35; 501/68; 501/73; 501/95; 264/332; 264/DIG. 19
[58] Field of Search ....................... 501/35, 68, 73, 95; 264/332, DIG. 19

[56] References Cited

U.S. PATENT DOCUMENTS 3,449,137  6/1969  Ekdahl .................................. 501/35

Primary Examiner—Howard S. Williams
Attorney, Agent, or Firm—Mark B. Quatt; Robert J. Edwards

[57] ABSTRACT

A mixture containing 35 to 65% by weight of $Al_2O_3$, 30 to 60% by weight of $SiO_2$, 1.5 to 4% by weight of $Cr_2O_3$, and 0.01 to 0.1% by weight of carbon, the balance being unavoidable impurities, is melted, and amorphous fibers are formed from said molten material by blowing or spinning. The fibers are heated rapidly to a temperature of 950° C. to 1,150° C., held at that temperature for several to about a dozen minutes, and cooled rapidly to ordinary room temperature.

8 Claims, 3 Drawing Figures

PROCESS FOR MANUFACTURING CERAMIC FIBERS CONSISTING MAINLY OF ALUMINA AND SILICA

BACKGROUND OF THE INVENTION

1. Field of the Invention

This invention relates to a process for manufacturing ceramic fibers consisting mainly of alumina and silica.

2. Description of the Prior Art

It is known that amorphous ceramic fibers consisting mainly of alumina ($Al_2O_3$) and silica ($SiO_2$) can be produced by melting a material containing 40 to 70% by weight of alumina, 30 to 60% by weight of silica and minor quantities of impurities, and blowing or spinning the molten material. It is also known that the thermal shrinkability of these ceramic fibers can be lowered if they are heated at a temperature not lower than their devitrification temperature so that the crystallization of mullite ($3Al_2O_3.2SiO_2$) may take place in the vitreous material.

Amorphous ceramic fibers, however, lose their heat resistance and strength if they are exposed to a temperature of at least about 1,000° C. for a long time, since a coarse crystal structure is formed by the growth of mullite crystals in glass, and makes the fibers brittle. Ceramic fibers containing mullite crystals have an improved resistance to thermal shrinkage, but it lasts only for a short time. As the growth of mullite crystals further proceeds, the formation of a coarse crystal structure brings about a reduction in fiber strength.

U.S. Pat. No. 3,449,137 teaches the manufacture of ceramic fibers containing about 1 to about 6% by weight of chromium oxide ($Cr_2O_3$) in addition to alumina and silica. The process taught by this patent has been tested, but the ceramic fibers thereby obtained have not shown any appreciable improvement in physical properties. The addition of chromium oxide is not sufficient for preventing the formation of coarse crystals by recrystallization, which results in higher degrees of thermal shrinkage and embrittlement of ceramic fibers, when they are exposed to a high temperature for a long time.

SUMMARY OF THE INVENTION

It is an object of this invention to provide a process which enables the manufacture of ceramic fibers which have a high degree of thermal stability even at a high temperature. This invention is particularly featured by employing a small quantity of carbon.

The object is attained by a process which essentially comprises melting a material containing 35 to 65% by weight of alumina, 30 to 60% by weight of silica, 1.5 to 4% by weight of chromium oxide and 0.01 to 0.1% by weight of carbon, forming amorphous fibers from the molten material, heating the fibers rapidly to a temperature of 950° C. to 1,150° C., holding the heated fibers at that temperature for several to about a dozen minutes, and cooling the heated fibers rapidly to ordinary room temperature.

The high thermal stability of the fibers is due to the separation of phases which takes place in the vitreous structure as a result of the heat treatment at a relatively low temperature. The fibers have a linear shrinkage not exceeding 2% even if they are exposed to a temperature of 1,300° C. or above. They do not undergo any appreciable embrittlement.

DETAILED DESCRIPTION OF THE INVENTION

The process of this invention includes melting a material containing 35 to 65% by weight of alumina ($Al_2O_3$), 30 to 60% by weight of silica ($SiO_2$), 1.5 to 4% by weight of chromium oxide ($Cr_2O_3$) and 0.01 to 0.1% by weight of carbon, the balance being unavoidable impurities. This melting can be carried out by an electric furnace. Amorphous fibers are formed from the molten material by a customary method, such as blowing or spinning.

Figure 1:
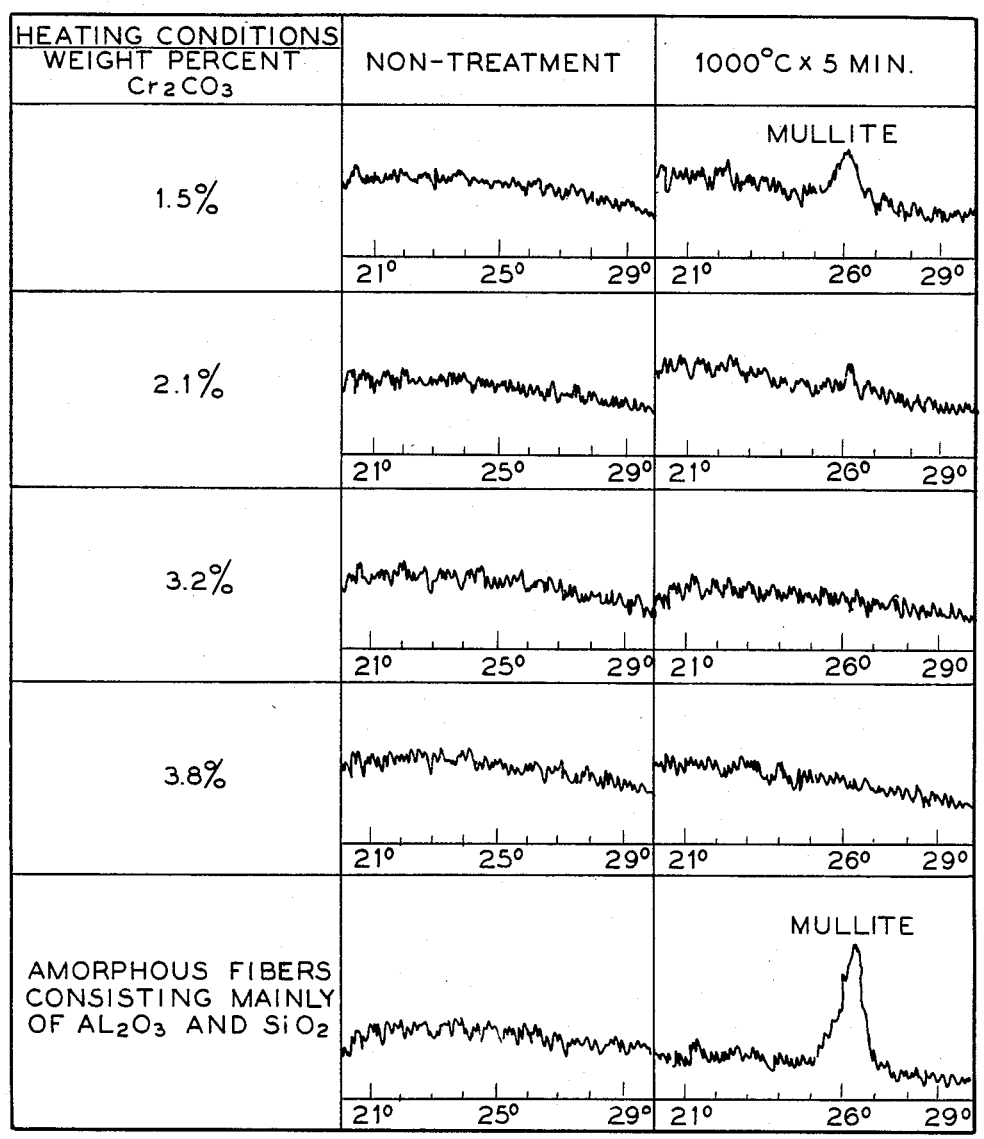
FIG. 1 shows by X-ray diffraction patterns the relationship between the quantity of chromium oxide in ceramic fibers and the formation of mullite crystals therein.

It is necessary to employ at least 1.5% by weight of $Cr_2O_3$ and at least 0.01% by weight of carbon. If less $Cr_2O_3$ and carbon are used, the formation of mullite crystals proceeds markedly, and embrittles the fibers, even if they are heat treated in accordance with this invention, as is obvious from the X-ray diffraction patterns in FIG. 1. The use of more than 4% by weight of $Cr_2O_3$ and more than 0.1% by weight of carbon does not produce any appreciably better results. The use of carbon in addition to $Cr_2O_3$ is important for avoiding the formation of coarse crystals in ceramic fibers, which results in an increase in their thermal shrinkage, and a reduction in their resiliency due to embrittlement, when they are exposed to a high temperature for a long time.

Figure 2:
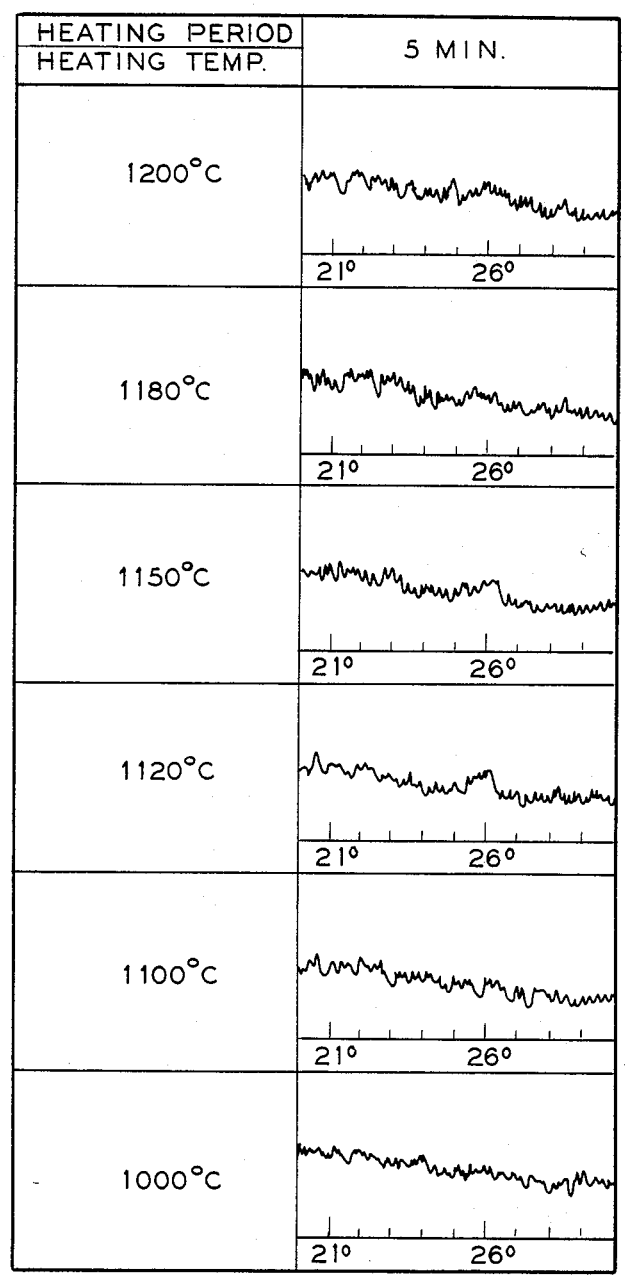
FIG. 2 shows by X-ray diffraction patterns the relationship between the temperature for the heat treatment of ceramic fibers and the formation of mullite crystals therein.

The fibers are heated to a temperature of 950° C. to 1,150° C., and held at that temperature for a period of several to a dozen or so minutes. These conditions have been experimentally found necessary and sufficient for causing the separation of phases in the amorphous structure of the ceramic fibers. If the fibers are held at a temperature below 950° C. for a shorter time than the range hereinabove defined, no satisfactory improvement in their resistance to thermal shrinkage can be expected, as will be obvious from the following description. If the fibers are held at a temperature above 1,150° C. for a longer time than the range hereinabove specified, the formation of mullite crystals proceeds, and embrittles the fibers, as is obvious from the following description, and FIG. 2 showing the X-ray diffraction patterns of the fibers containing 3.8% by weight of $Cr_2O_3$.

The fibers are heated rapidly to a temperature of 950° C. to 1,150° C., since only rapid heating enables the separation of phases in the ceramic structure. If the fibers are heated slowly, they have a linear shrinkage exceeding 2% when they are exposed to a temperature of 1,300° C. or above for a long time, and moreover, the embrittlement of the fibers takes place. According to the experimental results, it is preferable to heat the fibers at a rate of 100° C. to 1,000° C. per minute.

The invention will now be described by way of example.

EXAMPLE

A material containing 40% by weight of $Al_2O_3$, 56% by weight of $SiO_2$, 3.3% by weight of $Cr_2O_3$ and 0.1% by weight of carbon, the balance being unavoidable impurities, was melted in an electric furnace. The molten material was formed by blowing into amorphous fibers having an average diameter of 2.5 microns and a maximum length of 150 mm. A blanket having a thickness of 25 mm and a bulk specific density of 0.14 was formed from the fibers, and heat treated under the conditions shown in TABLES 1 and 2. TABLE 1 shows the linear shrinkage of the blankets heated at a temperature of 1,100° C. to 1,400° C. for 24 hours. TABLE 2 shows the resiliency of the fibers in terms of the restorability of blanket thickness after compression under heat. The blanket was heated under the conditions shown in TABLE 2, and compressed to a half in thickness.

TABLE 1

Linear shrinkage of fibers under heat (%) CASE 4640

| SAMPLE | A (Invention) | B | C | D | E | F |
|---|---|---|---|---|---|---|
| Heat treating conditions | 1,000° C., 5 min Heating rate: 1,000° C./min. | 800° C., 5 min Heating rate: 1,000° C./min. | 1,200° C., 5 min Heating rate: 1,000° C./min. | 1,000° C., 5 min Heating rate: 50° C./min. | 1,000° C., 20 min Heating rate: 1,000° C./min. | No heat treatment |
| Heating conditions | | | | | | |
| 1,100° C., 24 h | 0.2 | 1.7 | +0.3 | 0.4 | 0.1 | 1.7 |
| 1,200° C., 24 h | 0.7 | 2.9 | +0.1 | 0.9 | 1.5 | 2.9 |
| 1,300° C., 24 h | 1.0 | 3.8 | 0.5 | 2.1 | 2.1 | 3.8 |
| 1,400° C., 24 h | 1.4 | 4.5 | 0.8 | 2.3 | 4.8 | 4.5 |
| Defects found after heating | | | Powdering, deterioration and difficulty in handling due to embrittlement | Hardening | Hardening and powdering at high temperature | |

TABLE 2

CASE 4640

Restorability of thickness of the blankets heat treated under the conditions shown in TABLE 1, and compressed to a half in thickness (%)

| | SAMPLE | | | | | |
|---|---|---|---|---|---|---|
| Heating conditions | A (Invention) | B | C | D | E | F |
| 900° C., 50 h | 15.8 | 4.3 | 4.7 | 12.4 | 11.4 | 1.6 |
| 900° C., 100 h | 12.1 | 2.6 | 3.4 | 8.8 | 7.8 | 1.2 |
| 900° C., 300 h | 8.4 | 2.3 | 2.8 | 3.7 | 2.6 | 1.1 |
| 1,000° C., 50 h | 3.8 | 2.2 | 2.3 | 2.5 | 1.9 | 0.9 |

As is obvious from TABLES 1 and 2, the process of this invention produces a blanket of ceramic fibers having a linear shrinkage less than 2% when heated at 1,300° C. for 24 hours, and which is satisfactorily resilient.

The thermal stability and resiliency of a blanket of ceramic fibers produced by the process of this invention are apparently due to the separation of phases. The chromium oxide ($Cr_2O_3$) replaces a part of $Al_2O_3$ in the $Al_2O_3$-$SiO_2$ glass structure, and causes a stress in its lattice to inhibit crystallization. In the presence of a small quantity of atomic carbon, it is scattered in the lattices of the glass structure, and restricts their rearrangement. The rapid heating shortens the distance of diffusion of the constituents in the glass structure, and inhibits their crystallization, whereby there are formed a lot of finely divided separate phases consisting mainly of $Cr_2O_3$ and having different proportions of constituents.

Figure 3:
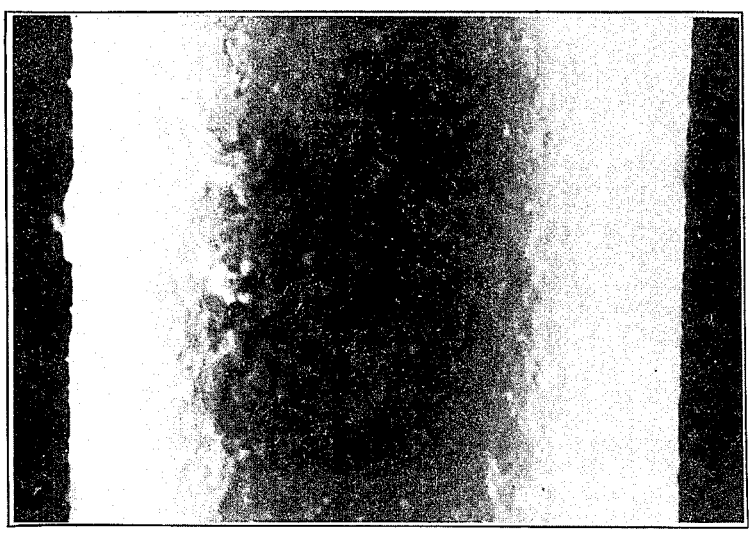
FIG. 3 is an electron microphotograph of 10,000 magnifications showing the ceramic fibers treated in accordance with this invention, and etched.

The ceramic fibers of this invention having separate phases hardly undergo recrystallization even if they are exposed to a high temperature. Even if they may undergo recrystallization by exposure to a higher temperature for a long time, the crystals are very small, since the separate phases forming the crystal grains, in which $Cr_2O_3$ forming the nucleus of the crystal coexists with carbon, are scattered numerously. The adjoining crystal grains mutually restrict their growth, and yield fibers composed of numerous fine crystals. These fibers provide a thermally stable and resilient blanket. FIG. 3 is an electron microphotograph of 10,000 magnifications showing the fibers which were treated in accordance with this invention, and etched. As is obvious therefrom, the fibers as a whole comprise finely divided separate phases. On the other hand, fibers not containing such separate phases and crystals are totally melted by similar etching treatment.

What is claimed is:

1. A process for manufacturing ceramic fibers consisting mainly of alumina and silica, which comprises:
   melting a material containing 35 to 65% by weight of $Al_2O_3$, 30 to 60% by weight of $SiO_2$, 1.5 to 4% by weight of $Cr_2O_3$, and 0.01 to 0.1% by weight of carbon, the balance being unavoidable impurities;
   forming amorphous fibers from said molten material;
   heating said amorphous fibers rapidly to a temperature of 950° C. to 1,150° C.;
   holding the heated fibers at said temperature for several to about a dozen minutes; and
   cooling the heated fibers rapidly to ordinary room temperature.

2. A process as set forth in claim 1, wherein said amorphous fibers are heated to said temperature at a rate of 100° C. to 1,000° C. per minute.

3. A process as set forth in claim 2, wherein said amorphous fibers are formed by a method selected from blowing and spinning.

4. A process as set forth in claim 3, wherein said material is melted by an electric furnace.

5. A ceramic fiber product consisting mainly of alumina and silica, which is produced by a method comprising:

melting a material containing 35 to 65% by weight of $Al_2O_3$, 30 to 60% by weight of $SiO_2$, 1.5 to 4% by weight of $Cr_2O_3$ and 0.01 to 0.1% by weight of carbon;

forming amorphous fibers from said molten material;

heating said amorphous fibers rapidly to a temperature of 950° C. to 1,150° C.;

holding the heated fibers at said temperature for several to about a dozen minutes; and cooling the heated fibers rapidly to ordinary room temperature.

6. A ceramic fiber product as set forth in claim 5, wherein said amorphous fibers are heated to said temperature at a rate of 100° C. to 1,000° C. per minute.

7. A ceramic fiber product as set forth in claim 6, wherein said amorphous fibers are formed by a method selected from blowing and spinning.

8. A ceramic fiber product as set forth in claim 7, wherein said material is melted by an electric furnace.

* * * * *